United States Patent
Muramoto (10) Patent No.: US 7,805,668 B2
(45) Date of Patent: Sep. 28, 2010

(54) WORK SPECIFICATION CORRECTING APPARATUS, AND WORK SPECIFICATION CORRECTING PROGRAM STORAGE MEDIUM

(75) Inventor: Yasuhiko Muramoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 834 days.

(21) Appl. No.: 11/594,125

(22) Filed: Nov. 8, 2006

(65) Prior Publication Data
US 2007/0124668 A1 May 31, 2007

(30) Foreign Application Priority Data
Nov. 28, 2005 (JP) .............................. 2005-341889

(51) Int. Cl.
*G06F 17/00* (2006.01)
(52) U.S. Cl. ..................... 715/209; 358/3.27; 700/97
(58) Field of Classification Search .................. 700/95, 700/97, 98, 100, 103, 105, 108–110, 121; 715/517, 526, 531, 229, 234, 247, 209; 358/504, 358/1.9, 1.15, 3.06, 3.21, 3.27, 517, 518
See application file for complete search history.

(56) References Cited

U.S. PATENT DOCUMENTS

| | | | | |
|---|---|---|---|---|
| 6,205,636 | B1* | 3/2001 | Abe et al. ................... | 700/194 |
| 6,510,359 | B1* | 1/2003 | Merkle et al. ................. | 700/95 |
| 6,549,820 | B1* | 4/2003 | Barrett et al. ............... | 700/110 |
| 6,725,115 | B2* | 4/2004 | Raymond et al. ........... | 700/110 |
| 6,725,184 | B1* | 4/2004 | Gadh et al. .................... | 700/97 |
| 6,813,539 | B2* | 11/2004 | Morimoto et al. ............. | 700/95 |
| 6,973,358 | B2* | 12/2005 | Yamamoto et al. ........... | 700/97 |
| 7,072,729 | B2* | 7/2006 | McCall et al. ................ | 700/97 |
| 7,196,816 | B2* | 3/2007 | Watanabe .................... | 358/1.9 |
| 7,555,712 | B2* | 6/2009 | Croft et al. .................. | 715/247 |
| 7,599,098 | B2* | 10/2009 | Cairns et al. ............... | 358/3.21 |
| 2003/0048475 | A1* | 3/2003 | Watanabe .................. | 358/1.15 |
| 2005/0240858 | A1* | 10/2005 | Croft et al. .................. | 715/500 |
| 2005/0280847 | A1* | 12/2005 | Cairns et al. ................. | 358/1.9 |
| 2007/0103732 | A1* | 5/2007 | Lin et al. .................... | 358/3.27 |

FOREIGN PATENT DOCUMENTS

JP 2000-293597 A 10/2000

* cited by examiner

*Primary Examiner*—Charles R Kasenge
(74) *Attorney, Agent, or Firm*—Sughrue Mion, PLLC (57) ABSTRACT

A work specification correcting apparatus comprises: a keeping section that keeps a correction rule to a work specification representative of a work content in a predetermined form, which is to be applied to a work apparatus for performing a work in accordance with the work specification, the correction rule being associated with a making source where the work specification is made; an obtaining section that obtains the work specification created by the making source; and a correcting section that applies a correction to the work specification obtained by the obtaining section in accordance with the correction rule kept in the keeping section in an association with the making source of the work specification, and transmits the corrected work specification to the work apparatus.

2 Claims, 8 Drawing Sheets

| 611a | 611b | 611c | 611d | 611e | 611f | 611g | 611h |
|---|---|---|---|---|---|---|---|
| CUSTOMER NAME | OVER PRINT CONDITION | TRAPPING CONDITION | TRANSPARENCY DEGREE CONDITION | COLOR CONVERSION CONDITION | CHARACTER APPEARANCE CONDITION | ERRATUM OMISSION OF WORD CORRECTION CONDITION | ROTATION CONDITION |
| "A" PRODUCTION | ORIGINAL EFFECTIVE | FATTEN UP BY 0.5mm BOUNDARY OF LIGHT COLOR | C-FORM PLATE:30% M-FORM PLATE:50% Y-FORM PLATE:50% K-FORM PLATE:0% | APPLY "SRGB" OBJECT NON-CONVERSION FOR "CMYK" OBJECT | ADJUST BOTH EDGES | AUTOMATIC CORRECTION | NEGLECT DESIGNATION OF PAGE ROTATION |
| "B" PUBLICATION | FORCED TURN-OFF | ORIGINAL EFFECTIVE | C-FORM PLATE:0% M-FORM PLATE:0% Y-FORM PLATE:0% K-FORM PLATE:0% | ORIGINAL EFFECTIVE | ORIGINAL EFFECTIVE | ORIGINAL EFFECTIVE | ROTATE RIGHT EVENLY 90° DESIGNATION OF PAGE ROTATION |
| "C" ADVERTISEMENT PRODUCTION | TURN ON K-FORM PLATE ONLY | ORIGINAL EFFECTIVE | ORIGINAL EFFECTIVE | APPLY "SRGB" OBJECT NON-CONVERSION FOR "CMYK" OBJECT | ORIGINAL EFFECTIVE | AUTOMATIC CORRECTION | ORIGINAL EFFECTIVE |
| ... | ... | ... | ... | ... | ... | ... | ... |

WORK SPECIFICATION CORRECTING APPARATUS, AND WORK SPECIFICATION CORRECTING PROGRAM STORAGE MEDIUM

BACKGROUND OF THE INVENTION

1. Field of the Invention

The present invention relates to a work specification correcting apparatus for correcting work specification in which the content of work is represented by a predetermined form, and a work specification correcting program storage medium for storing a work specification correcting program which causes a computer to operate as such a work specification correcting apparatus.

2. Description of the Related Art

In recent years, the computerization is advanced in the print field, and there is widespread such a system that an editor edits the page of printed matter on the computer for the edit, and uses, as a manuscript, an image file representative of an image on the page in a state that an arrangement position for the character and the photograph, etc. is fixed.

An image file that is created through page editing by an editor is general the one of the form called PDF (Portable Document Format) for instance where the page is described by the page description language, and an image formation system that is used in the printing industry is general the one of the form that an image is formed in accordance with the image file of such a form.

Such computerization is applied to the proofreading of printed matter too, and there is proposed the technology that an editor performs on a computer a correcting instruction which was carried out in the past by writing it directly with the pen in printed matter for the proofreading (cf. for example, Japanese Patent Laid Open Gazette TokuKai. 2000-293597).

By the way, the image file as mentioned above is composed of part data representative of image parts and character parts arranged on a page, arrangement data representative of an arrangement of individual parts, and work specifications showing the usages of parts to arrange the image of the page.

Here, there is something where the above-mentioned work specification is described by mistake in the image file sent to a printing office by an editor because the editor is not accustomed to the operation of the application tool that treats the page description language. The majority of such a wrong work specification is often the one judged to be obviously wrong by a print trader side where sending manuscripts to a printing office was received, and such a work specification is often corrected by the print trader's judgment.

Such correction work is done by the operator's confirming the content of the above-mentioned image file at present one by one and searching out a wrong part. Such work takes a great deal of time, and causes the decrease on the print trader side in the work efficiency.

Moreover, in the above description, there is raised by way of example the correction work by the print trader to the image file sent to a printing office by the editor, and explained the problem of decrease in the work efficiency of the correction work. Such a problem is a problem of generally bringing about when correcting for the work specification given to a work device that works in accordance with the work specification to reflect the content of work by a prescribed form.

SUMMARY OF THE INVENTION

In view of the foregoing, it is an object of the present invention to provide a work specification correcting apparatus capable of efficiently correcting work specification in which the content of work is represented by a predetermined form, and a work specification correcting program storage medium for storing a work specification correcting program which causes a computer to operate as such a work specification correcting apparatus.

To achieve the above-mentioned object, the present invention provides a work specification correcting apparatus comprising:

a keeping section that associates a correction rule to a work specification representative of a work content in a predetermined form, which is to be applied to a work apparatus for performing a work in accordance with the work specification, with a making source where the work specification is made, and keeps the correction rule;

an obtaining section that obtains the work specification created by the making source; and a correcting section that applies a correction to the work specification obtained by the obtaining section in accordance with the correction rule saved in the keeping section in an association with the making source of the work specification, and transmits the corrected work specification to the work apparatus.

In the work specification correcting apparatus according to the present invention as mentioned above, it is preferable that the work apparatus arranges an image of a page in accordance with the work specification indicating how to use given parts to be arranged on the page, and the correcting section corrects a way as to how to use parts indicated by the work specification in accordance with the correction rule.

According to the work specification correcting apparatus of the present invention, the content of the correction of a wrong part in which for instance a making source always makes a mistake in the work specification is kept in the above-mentioned keeping section as the above-mentioned correction rule. This feature makes it possible to automatically correct the work specification in accordance with the correction rule associated with the making source of the work specification. It often happens that wrong parts and contents in the work specification included in an image file entered from editors are roughly decided in each editor or making source of the work specification generally. In effect, according to the work specification correcting apparatus of the present invention, it is possible to efficiently correct work specification in which the content of work is represented by a predetermined form.

In the work specification correcting apparatus according to the present invention as mentioned above, it is preferable that the work apparatus arranges an image of a page in accordance with the work specification indicating how to use given parts to be arranged on the page, the work specification includes an over print condition indicative of whether an over print, wherein colors of parts mutually superposed are overlapped with one another, is admitted, the correcting section corrects the over print condition in accordance with the correction rule.

In the work specification correcting apparatus according to the present invention as mentioned above, it is preferable that the work apparatus arranges an image of a page in accordance with the work specification indicating how to use given parts to be arranged on the page, the work specification includes a trapping condition indicative of a size of an edge as to trapping wherein as to a part where other parts came in succession up, the part is deleted leaving the edge, and the correcting section corrects the trapping condition in accordance with the correction rule.

In the work specification correcting apparatus according to the present invention as mentioned above, it is preferable that the work apparatus arranges an image of a page in accordance with the work specification indicating how to use given parts to be arranged on the page, the work specification includes a transparency degree condition indicative of a transparency degree of a color of parts of an upper side as to an over print wherein colors of parts mutually superposed are overlapped with one another, and the correcting section corrects the transparency degree condition in accordance with the correction rule.

In the work specification correcting apparatus according to the present invention as mentioned above, it is preferable that the work apparatus arranges an image of a page in accordance with the work specification indicating how to use given parts to be arranged on the page, the work specification includes a color conversion condition indicative of a content of color conversion wherein colors of parts are converted, and the correcting section corrects the color conversion condition in accordance with the correction rule.

In the work specification correcting apparatus according to the present invention as mentioned above, it is preferable that the work apparatus arranges an image of a page in accordance with the work specification indicating how to use given parts to be arranged on the page, the work specification includes a character appearance condition indicative of a character appearance of parts representative of a character, and the correcting section corrects the character appearance condition in accordance with the correction rule.

In the work specification correcting apparatus according to the present invention as mentioned above, it is preferable that the work apparatus arranges an image of a page in accordance with the work specification indicating how to use given parts to be arranged on the page, the work specification includes erratum omission of word correction condition indicative of whether erratum omission of word is corrected for parts representative of a character, and the correcting section corrects erratum omission of word correction condition in accordance with the correction rule.

In the work specification correcting apparatus according to the present invention as mentioned above, it is preferable that the work apparatus outputs an image onto a sheet in accordance with a work specification indicative of an output format onto the sheet of the image, the work specification includes a rotation condition that rotates a direction of the image to the sheet, the correcting section corrects the rotation condition in accordance with the correction rule.

An image file, such as PDF for instance, includes, as various kinds of conditions indicative of a way as to how to use parts to be arranged on a page, and a way of output to sheets, an over print condition, a trapping condition, a transparency degree condition, a color conversion condition, a character appearance condition, erratum omission of word correction condition, and a rotation condition. Those conditions are different in frequency of errors in accordance with editors who are inexperienced in editing. Meanwhile, editor's individuality tends to appear to how to differ. The correction of the image file according to the editor to these conditions is automatically done in the typical above-mentioned form.

To achieve the above-mentioned object, the present invention provides a work specification correcting program storage medium storing a work specification correcting program which causes a computer to operate as a work specification correcting apparatus, when the work specification correcting program is executed in the computer, wherein the work specification correcting apparatus comprising:

a keeping section that associates a correction rule to a work specification representative of a work content in a predetermined form, which is to be applied to a work apparatus for performing a work in accordance with the work specification, with a making source where the work specification is made, and keeps the correction rule;

an obtaining section that obtains the work specification created by the making source; and a correcting section that applies a correction to the work specification obtained by the obtaining section in accordance with the correction rule saved in the keeping section in an association with the making source of the work specification, and transmits the corrected work specification to the work apparatus.

When the work specification correcting program is executed in the computer, it is possible to readily implement a work specification correcting apparatus capable of efficiently correcting the work specification in which the content of work is represented by a predetermined form.

A work specification correcting program, which is stored the work specification correcting program storage medium of the present invention, includes any types of programs which causes a computer to operate as the work specification correcting apparatus as mentioned above.

DETAILED DESCRIPTION OF PREFERRED EMBODIMENTS

Embodiments of the present invention will be described with reference to the accompanying drawings.

Figure 1:
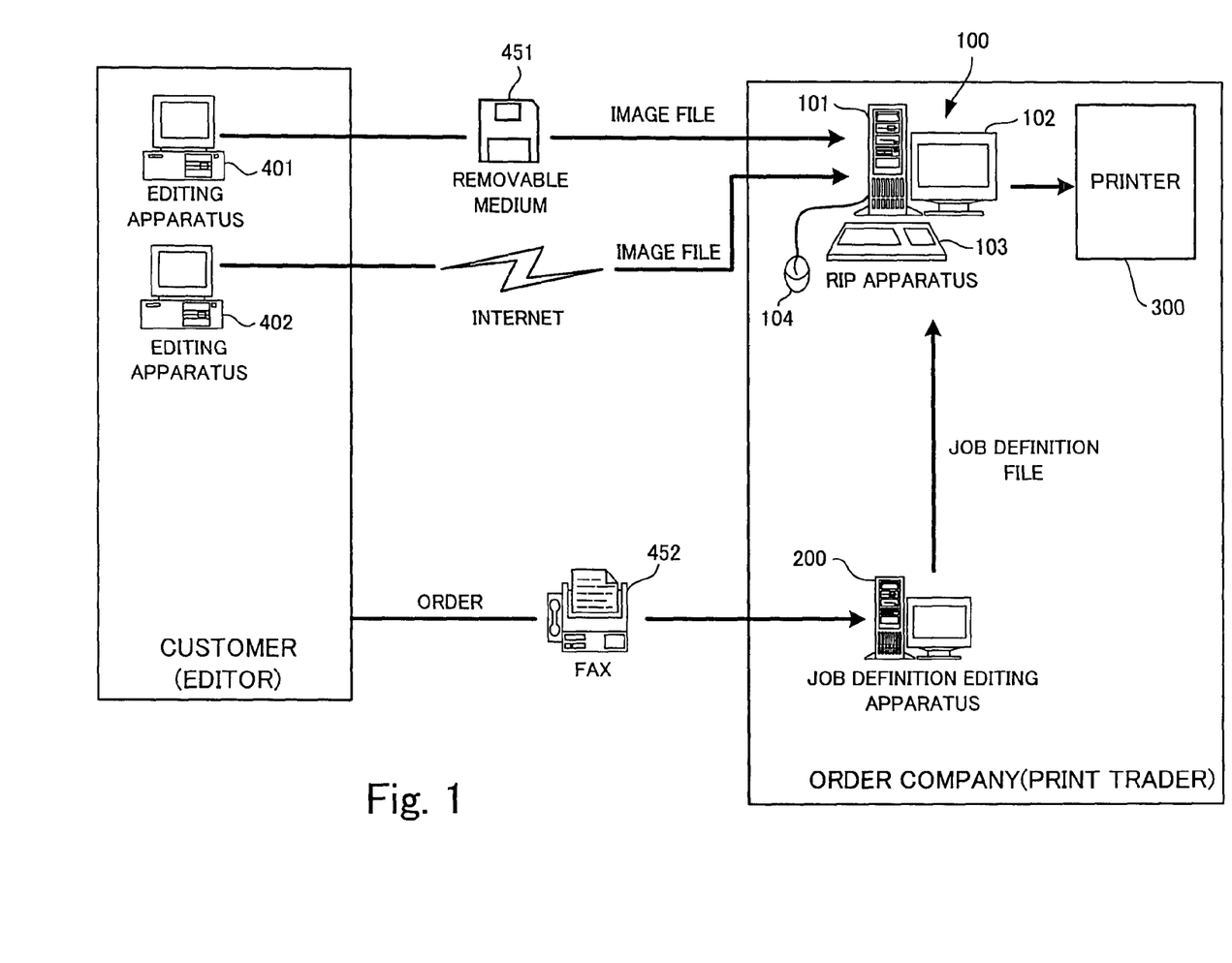
FIG. 1 is a view of a printing system into which an embodiment of the present invention is incorporated.

FIG. 1 is a view of a printing system into which an embodiment of the present invention is incorporated.

The printing system of FIG. 1 is to perform the on-demand printing. The printing system comprises computers 401 and 402 each constituting an editing apparatus which is used by an editor as a customer, a computer 100 constituting a RIP apparatus which is used by a print trader as an order receiving company, a computer 200 constituting a job definition editing apparatus for editing a job definition file that defines various conditions related to RIP processing to be executed in the RIP apparatus, and a printer 300 for on-demand printing.

The editing apparatus serves to edit on data a page constituting a printed matter so as to create an image file. The image file is composed of image part data representative of image parts arranged on a page, character part data representative of character parts arranged on a page, arrangement data representative of an arrangement of individual parts, and work specifications showing the usages of parts to arrange the image of the page.

Figure 2:
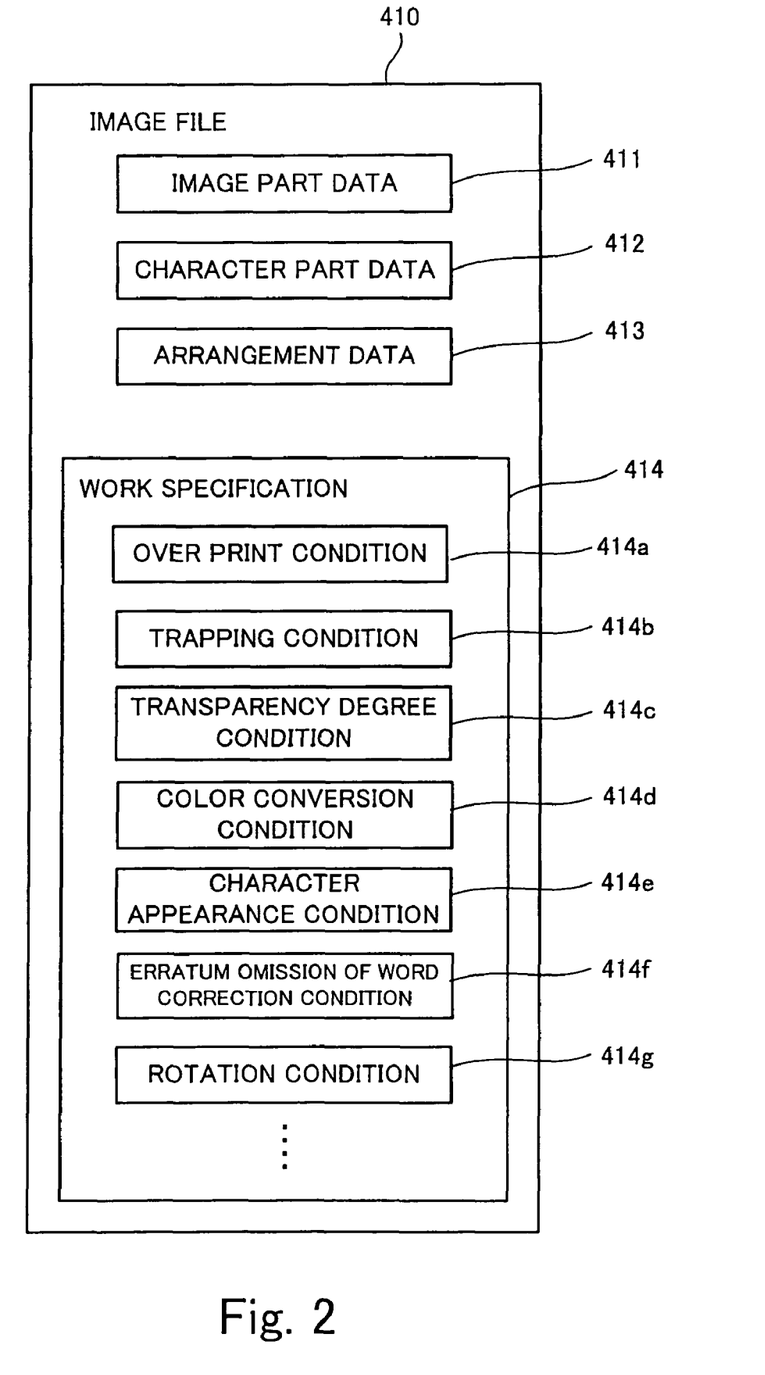
FIG. 2 is a view of a file structure of an image file.

FIG. 2 is a view of a file structure of an image file.

As shown in FIG. 2, an image file 410 comprises: image part data 411 representative of image parts such as images obtained through photography by for instance a digital camera or images obtained through reading by a scanner, and graphic images created on a computer; character part data 412 representative of character parts such as sentences; arrangement data 413 representative of an arrangement of individual parts on a page; and work specification 414 showing the usages of parts to arrange the image of the page. The image parts represented by the image part data 411 and the character parts represented by the character part data 412 correspond to examples of "parts arranged on a page" referred to in the present invention. The work specification 414 corresponds to an example of "work specification" referred to in the present invention.

In FIG. 2, of various conditions included in the work specification 414, there are shown an over print condition 414a, a trapping condition 414b, a transparency degree condition 414c, a color conversion condition 414d, a character appearance condition 414e, erratum omission of a word correction condition 414f, and the rotation condition 414g. Here, the over print condition 414a, the trapping condition 414b, the transparency degree condition 414c, the color conversion condition 414d, the character appearance condition 414e, the erratum omission of a word correction condition 414f and the rotation condition 414g correspond to examples of the over print condition, the trapping condition, the transparency degree condition, the color conversion condition, the character appearance condition, the erratum omission of a word correction condition, and the rotation condition, referred to in the present invention, respectively.

The over print condition 414a is the one that it is shown whether to admit the over print that overlaps the colors of parts that overlap mutually.

The trapping condition 414b becomes effective for the prohibition of the over print in the above-mentioned over print condition 414a, and the one that the size of the edge is shown about the trapping that leaves the edge and deletes it of the part where other parts came in succession up. An unnecessary space is prevented in surroundings in the part where the image was piled up on other parts by being united according to the trapping condition 414b.

The transparency degree condition 414c becomes effective for the permission of the over print, and the one to show the transparency of the colors of upper parts.

The color conversion condition 414d shows the content of the color conversion of converting the image part data 411 into RGB data in which the color is defined by the SRGB color space of the ICC (International Color Consortium) recommendation for instance when image part data 411 is RGB data in which the color is defined by RGB color space of three red (R), green (G), and blue (B) colors.

The character appearance condition 414e indicates the appearance of arranging a right and left edge of the character string on the page for instance about the character represented by the character part data 412.

The erratum omission of a word correction condition 414f indicates whether to correct the erratum omission of a word to the character represented by the character part data 412.

The rotation condition 414g indicates how an image on a page rotates to a paper to output it.

Such an image film is transferred to a printing office through storage medium (removable medium) 451 such as CD-ROM, optical disk, MO, flexible disks (FD), and magnetic tapes, that can be carried, or Internet that can be carrying, as shown in FIG. 1. The image file sent to the printing office is input to the RIP device that the print trader uses.

According to the printing system shown in FIG. 1, editor orders to the print trader by a facsimile 452 print based on the image file transferred. Moreover, in that case, information necessary for the print, such as models of for instance the digital camera, scanners, and computers that obtain the above-mentioned image parts, is transmitted through the facsimile 452 to the print trader.

The job definition editing apparatus edits a job definition file that defines contents of RIP processing (which will be described later) in accordance with information transmitted from the editor side through the facsimile 452.

Figure 3:
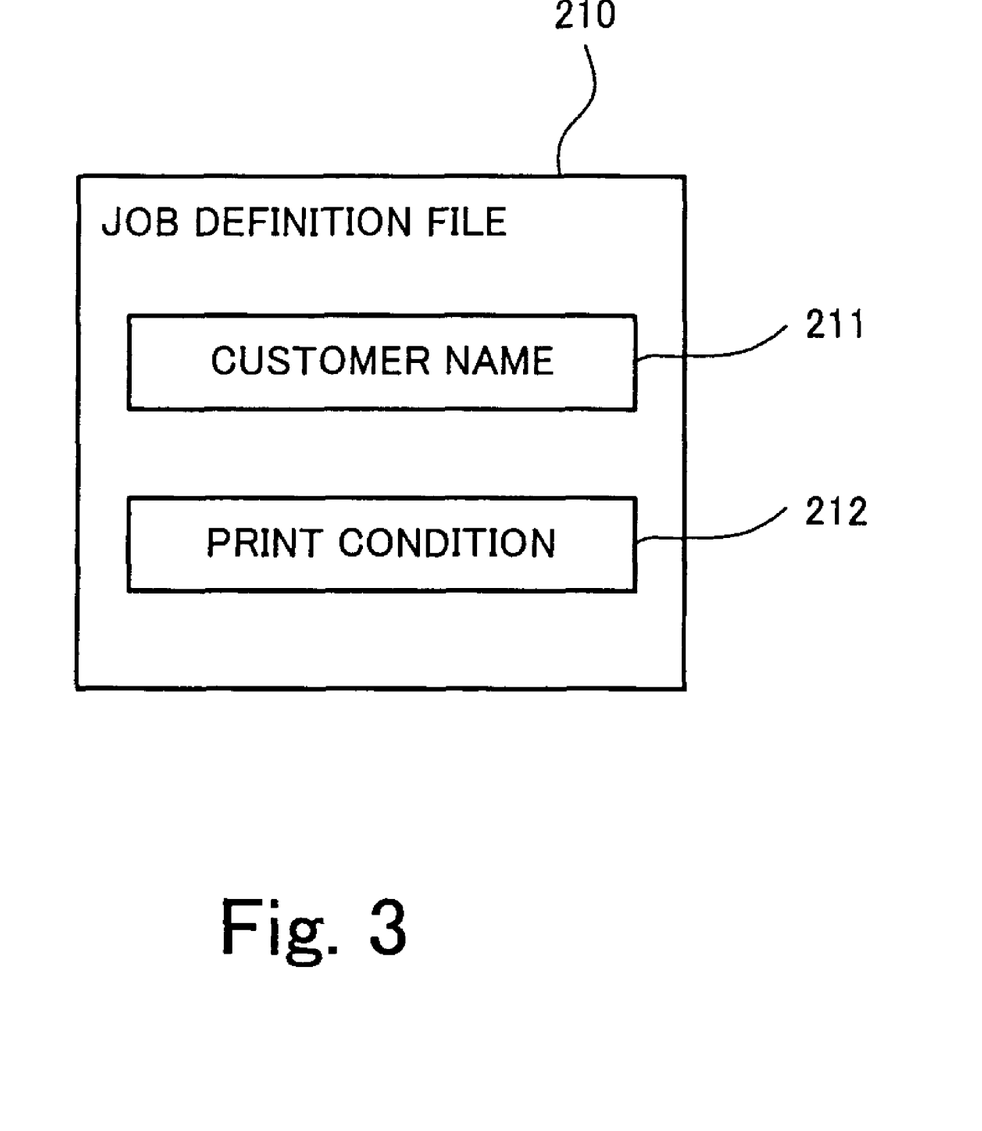
FIG. 3 is a view of a file structure of a job definition file.

FIG. 3 is a view of a file structure of a job definition file.

As shown in FIG. 3, a job definition file 210 comprises a customer name 211 which specifies an editor who enters an image file, and printing conditions 212 representative of contents of RIP processing according to information transmitted from the editor side. The printing conditions 212 include conditions such as a color definition depending on the digital camera, scanners, and computers that obtain the above-mentioned image parts, the association with a color definition depending on the printer 300 at the print trader side, the method of the expression with the printer 300 of the spot color, and the method of the expression with the printer 300 of the primary color and the secondary color in the image.

As seen from FIG. 1, the above-mentioned job definition file, which is created by the computer 200 that operates as the job definition editing apparatus, is transferred to the computer 100 that operates as the RIP apparatus.

The RIP apparatus, first of all, applies correction, which will be described later, to the entered image file. According to the RIP apparatus, RIP processing for converting the corrected image file to image data (raster data) representative of an image with a raster image for the printer 300 is performed in accordance with the job definition file transferred from the job definition editing apparatus. Raster data, which is obtained by the RIP processing, is transmitted to the printer 300.

The printer 300 outputs an image according to the raster data transmitted from the RIP apparatus.

According to the printing system shown in FIG. 1, the work specification correcting apparatus of the present invention is incorporated into the RIP apparatus. Therefore, hereinafter, there will be explained the embodiment of the work specification correcting apparatus of the present invention referring to the computer 100 that constitutes the RIP apparatus.

The computer 100, which serves as the RIP apparatus, comprises, on an external appearance, a main frame unit 101 that incorporates therein CPU, a main memory a hard disk unit, and a communicating board, a CRT display unit 102 for displaying images and character string on a display screen in accordance with an instruction from the main frame unit 101, a keyboard 103 for inputting various sorts of information such as a user's instruction and character information to the main frame unit 101 in accordance with a key operation, and a mouse 104 for inputting an instruction according to, for example, an icon and the like, through designation of an optional position on the display screen of the CRT display unit 102, the icon and the like being displayed on the position on the display screen.

The main frame unit 101 incorporates therein a CD-ROM drive 115 (not illustrated in FIG. 1, and cf. FIG. 4) for accessing a CD-ROM 105 (not illustrated in FIG. 1, and cf. FIG. 4) and a CD-R which are detachably mounted thereon. The main frame unit 101 further incorporates therein an MO (magneto-optical disk) drive 114 (not illustrated in FIG. 1, and cf. FIG. 4) for accessing an MO (magneto-optical disk) 105 (not illustrated in FIG. 1, and cf. FIG. 4) which is detachably mounted thereon.

Figure 4:
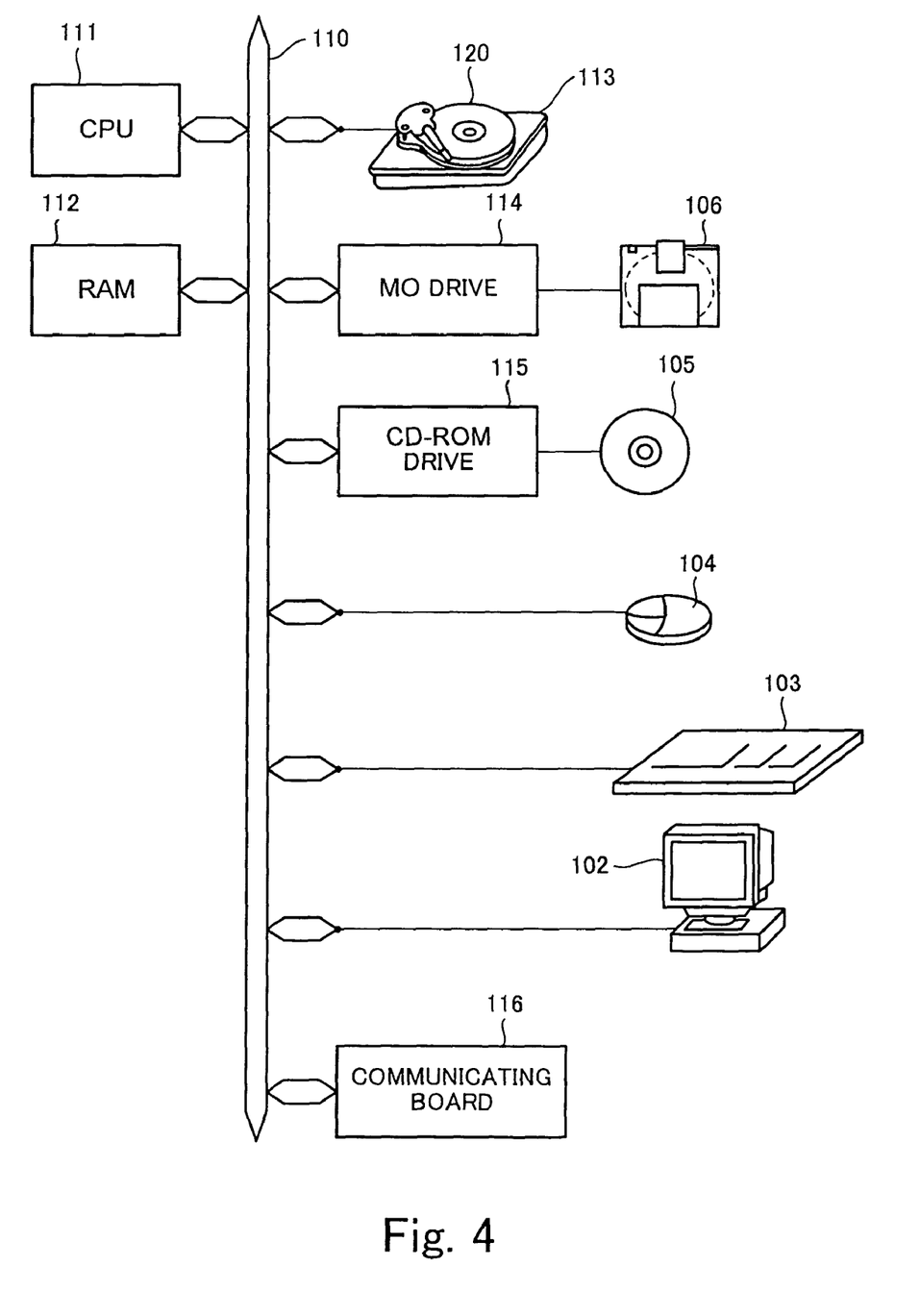
FIG. 4 is a hardware structural view of a computer 100 which operates as RIP apparatus.

FIG. 4 is a hardware structural view of a computer 100 which operates as RIP apparatus.

The computer 100 comprises, as shown in FIG. 4, a CPU (Central Processing Unit) 111, a RAM 112, a HDD (hard disk drive) 113, the MO (magneto-optical disk) drive 114, the CD-ROM drive 115, and a communicating board 116. These various types of elements are connected via a bus 110 to one another.

The HDD 113 incorporates therein a hard disk 120 that is recording medium's kind, and performs recording and reproduction of information to the hard disk 120.

The communicating board 116 is connected to a communication line such as a LAN (local area network). The computer 100, which serves as the RIP apparatus, can perform transmission and receiving of data between other computer systems through a communication network that is connected via the communicating board 116 to the computer 100, and also can perform output of raster data directed to a printer 300.

FIG. 4 also shows the mouse 104, the keyboard 103, and the CRT display unit 102 (also shown in FIG. 1), which are connected via two or more I/O interfaces (not illustrated) to a bus 110.

The RIP program that causes the computer 100 to serve as the RIP apparatus into which an embodiment of a work specification correcting apparatus of the present invention is built is installed in the computer 100 as explained above. According to the present embodiment, the CD-ROM 105 stores the RIP program. The CD-ROM 105 is mounted on the main frame unit 101. The CD-ROM drive 115 reads the RIP program stored in the CD-ROM 105, so that the RIP program is installed in the hard disk 120 via the bus 110. When the RIP program installed in the hard disk 120 is activated and executed, the computer 100 operates as the RIP apparatus.

Hereinafter, there will be explained the RIP apparatus constructed by the computer 100.

Figure 5:
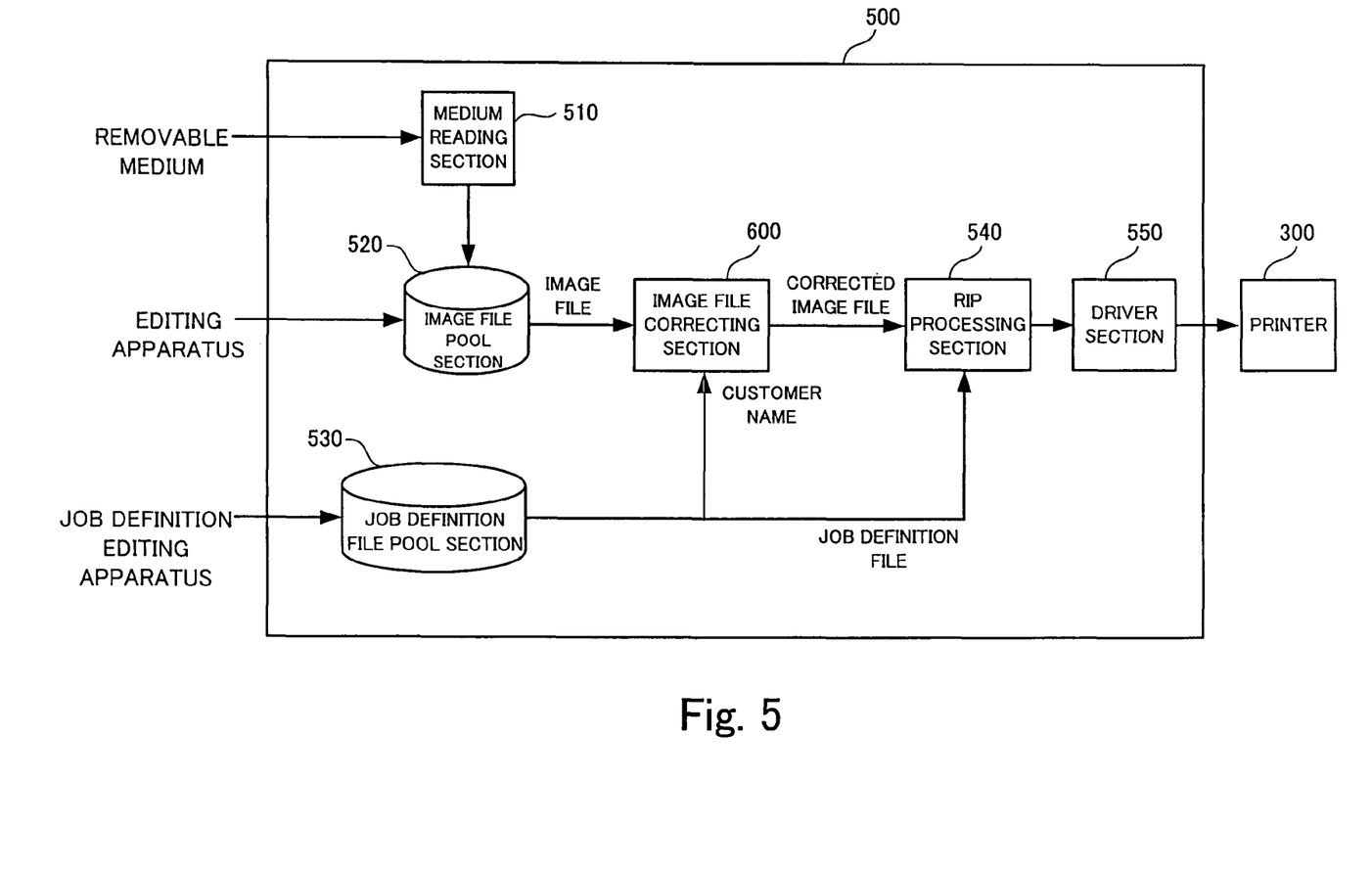
FIG. 5 is a functional block diagram of the RIP apparatus.

FIG. 5 is a functional block diagram of the RIP apparatus.

The RIP apparatus 500, which is shown in FIG. 5, is constructed when the RIP program that causes the computer 100 to serve as the RIP apparatus 500 is installed in the computer 100 shown in FIG. 1 and executed. The RIP apparatus 500 comprises a medium reading section 510, an image file pool section 520, a job definition file pool section 530, an image file correcting section 600, a RIP processing section 540, and a driver section 550. The image file correcting section 600 of the RIP apparatus 500 corresponds to an embodiment of a work specification correcting apparatus of the present invention.

The combination of the RIP processing section 540, the driver section 550, and the printer 300 corresponds to an example of the work apparatus referred to in the present invention, which forms an image of a page in accordance with the work specification as shown in FIG. 2, and finally outputs the image on a sheet.

The medium reading section 510 reads the image file of the file structure shown in FIG. 2, which is entered through the removable medium 451 shown in FIG. 1. The image file thus read is temporarily saved in the image file pool section 520.

The image file, which is entered through an internet, is directly fed to the image file pool section 520 and then stored therein.

The job definition file pool section 530 receives the job definition file of the file structure shown in FIG. 3 and temporarily saves the same.

The image file correcting section 600 applies correction processing, which will be described later, to the image file saved in the image file pool section 520. The image file correcting section 600 applies the correction processing to the image file in accordance with the customer's names of the job definition file saved in the job definition file pool section 530, as will be described later.

The RIP processing section 540 converts the image film corrected by the image file correcting section 600 into raster data for the printer 300 in accordance with the printing condition of the job definition file. The driver 550 transmits to the printer 300 the raster data, which is obtained by the conversion.

The explanation for details of each component in the RIP apparatus 500 as explained above except the image file correction part 600 will be omitted, because it is concerned with no subject of the present invention, and there will be explained the image file correcting section 600, hereinafter.

The image file correcting section 600 is constructed when the image correcting program, which is incorporated into the RIP program that causes the computer 100 to serve as the RIP apparatus 500, is executed. Also as to the parts other than the image correction processing of the RIP program, the explanation for those parts will be omitted, because it is concerned with no subject of the present invention.

Figure 6:
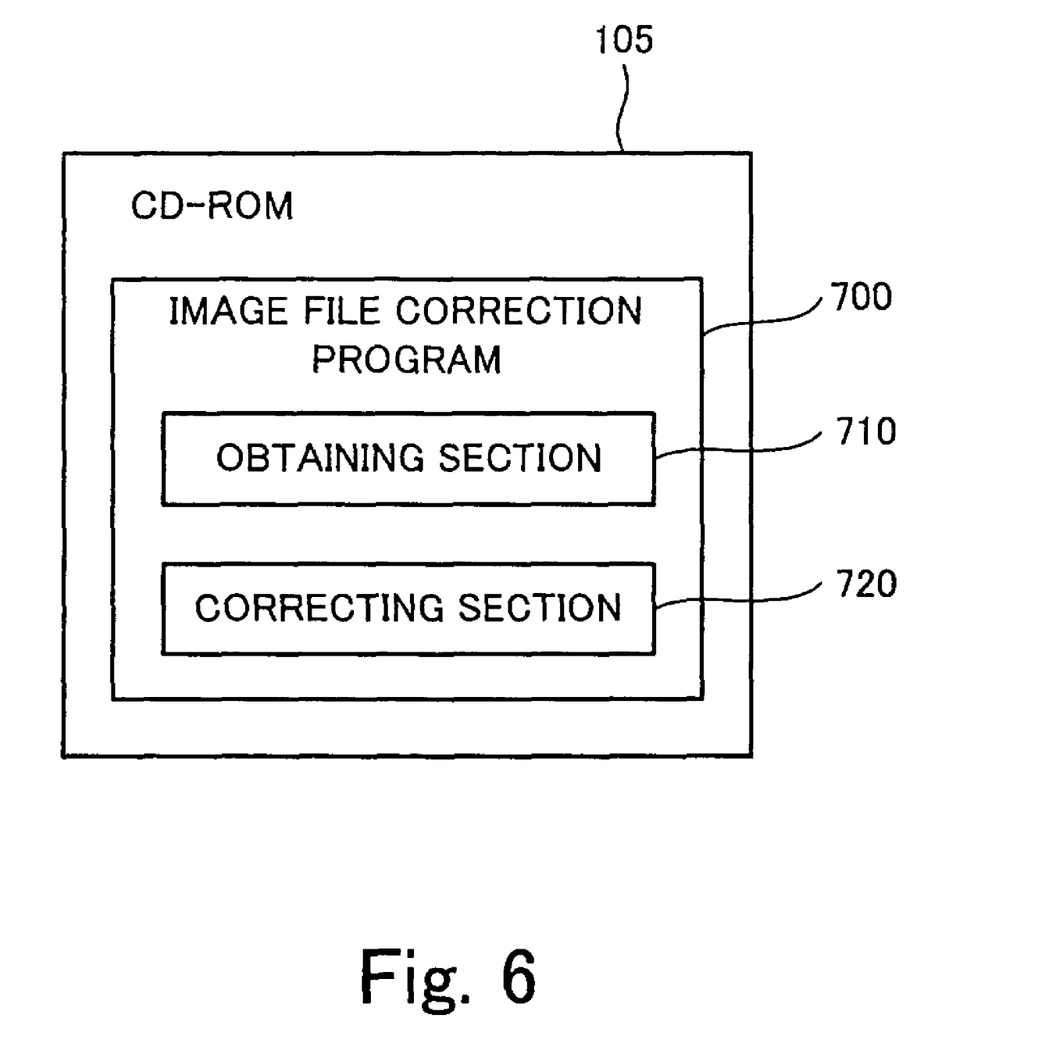
FIG. 6 is a typical illustration useful for understanding an image correction program which is an embodiment of a work specification correcting program related to the present invention.

FIG. 6 is a typical illustration useful for understanding an image correction program which is an embodiment of a work specification correcting program related to the present invention.

FIG. 6 typically shows the CD-ROM 105 which stores an image correction program 700 which is an embodiment of a work specification correcting program related to the present invention.

The image correction program 700 causes the computer 100 to serve as the image file correcting section 600. The image correcting program 700 comprises an obtaining section 710, and a correcting section 720. The explanation for details of each component in the image correcting section 700 will be made later.

Figure 7:
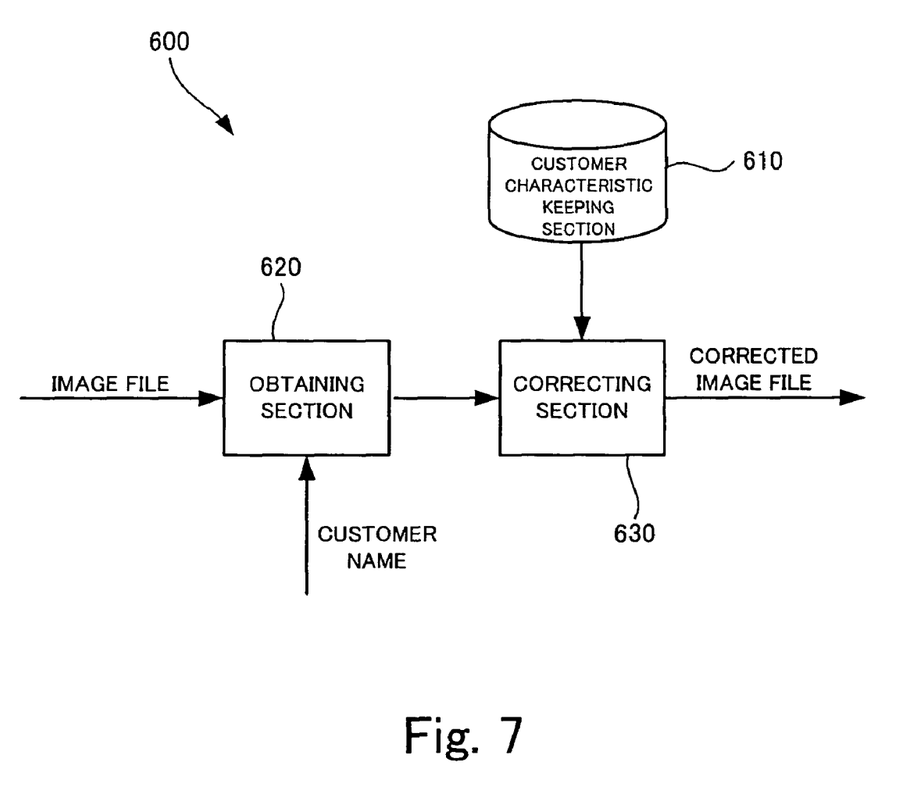
FIG. 7 is a block diagram of an image file correcting section 600 that is an embodiment of a work specification correcting apparatus of the present invention, which is shown in FIG. 5.

FIG. 7 is a block diagram of the image file correcting section 600 that is an embodiment of a work specification correcting apparatus of the present invention, which is shown in FIG. 5.

The image file correcting section 600 shown in FIG. 7 is implemented when the image correcting section 700 of FIG. 6 is installed in the computer 100 of FIG. 1.

The image file correcting section 600 comprises a customer characteristic keeping section 610, an obtaining section 620, and a correcting section 630.

When the image correcting program 700 of FIG. 6 is installed in the computer 100 of FIG. 1, the obtaining section 710 and a correcting section 720 of the image correcting program 700 construct the obtaining section 620 and the correcting section 630 of the image file correcting section 600 shown in FIG. 7, respectively. While the individual elements of the image file correcting section 600 are constructed by the combination of the hardware of a computer with OS and application program, which are executed in the computer, the individual elements of the image correcting program 700 of FIG. 6 are constructed with only the application program.

The customer characteristic keeping section 610, the obtaining section 620, and the correcting section 630 of the image file correcting section 600 correspond to examples of the keeping section, the obtaining section, and the correcting section of the a work specification correcting apparatus of the present invention, respectively.

Hereinafter, the individual elements of the image file correcting section 600 shown in FIG. 7 will be explained, and the individual elements of the image correcting program 700 shown in FIG. 6 will be explained together.

The customer characteristic keeping section 610 associates the correction rule to the work specification of the image file shown in FIG. 2 with the name of the customer in which an editor is specified, and keeps the same in form of the following customer characteristic information.

Figure 8:
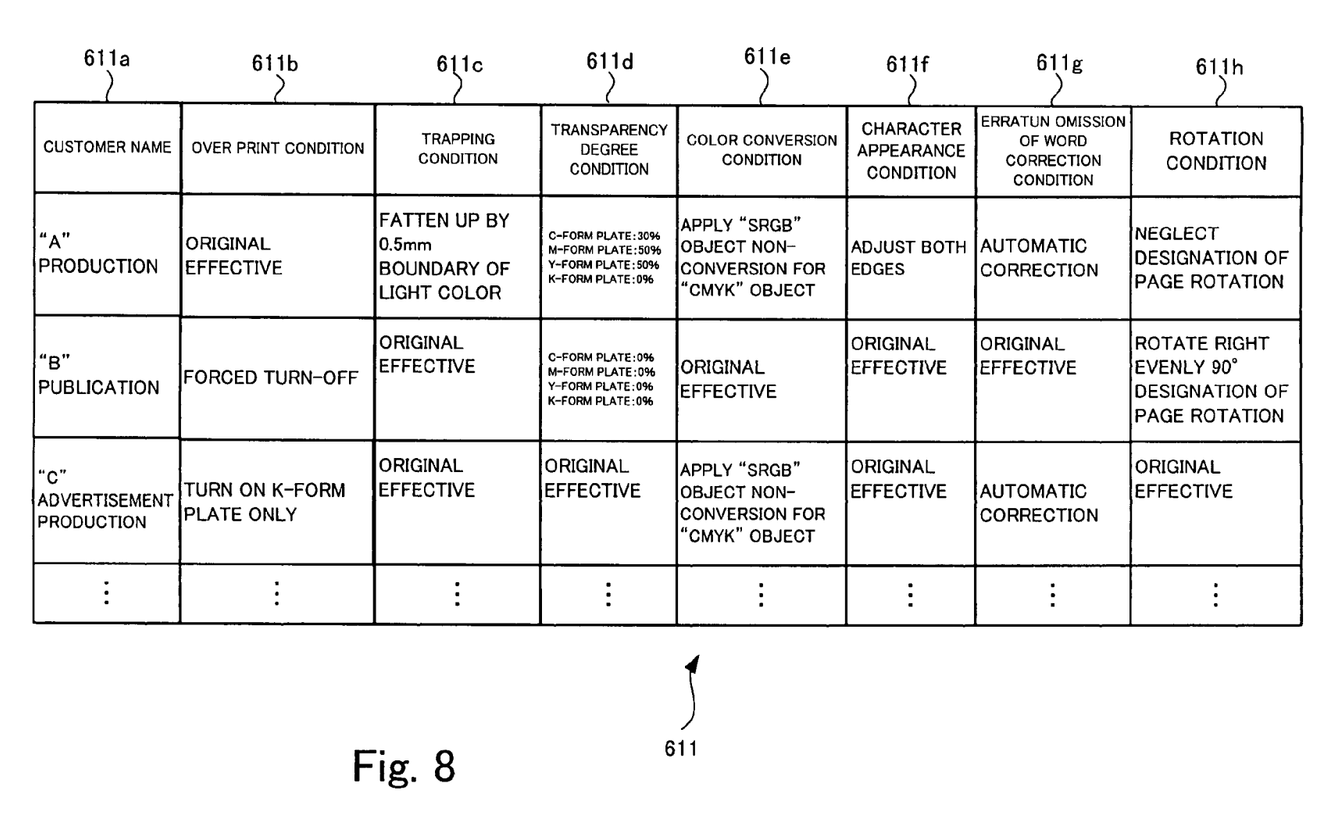
FIG. 8 is a view showing an example of customer property information.

FIG. 8 is a view showing an example of customer characteristic information.

FIG. 8 shows customer characteristic information 611 in form of a table form.

In the customer characteristic information 611, there are defined correction contents for seven sorts of conditions such as the over print condition 414a, the trapping condition 414b, the transparency degree condition 414c, the color conversion condition 414d, the character appearance condition 414e, erratum omission of a word correction condition 414f, and the rotation condition 414g, as shown in FIG. 2. Those seven sorts of conditions are often erroneously described when an editor creates an image file. Further, editor's individuality tends to appear as to the way of making a mistake in the description. In view of the foregoing, in the customer characteristic information 611, the content of the correction to these conditions is defined according to the editor.

The customer characteristic information 611 comprises customer name information 611a, and seven sorts of correction information such as over print condition correction information 611b, trapping condition correction information 611c, transparency degree condition correction information 611d, color conversion condition correction information 611e, character appearance condition correction information 611f, erratum omission of word correction condition correction information 611g and rotation condition correction information 611h, which are representative of correction content to the above-mentioned seven sorts of conditions.

The over print condition correction information 611b represents the correction content to the over print condition 414a shown in FIG. 2. The trapping condition correction information 611c represents the correction content to the trapping condition 414b. The transparency degree condition information 611d represents the correction content to the transparency degree condition 414c. The color conversion condition information 611e represents the correction content to color conversion condition 414d. The character appearance condition information 611f represents the correction content to the character appearance condition 414e. The erratum omission of word correction condition information 611g represents the correction content to the erratum omission of word correction condition 414f. The rotation condition information 611h represents the correction content to the rotation condition 414g.

In the customer characteristic information 611, these seven kinds of correction information is described according to the name of the customer in the customer name information 611a. The seven kinds of correction information of the customer characteristic information 611 correspond to the examples of the correction rules referred to in the present invention.

FIG. 8 shows the customer characteristic information 611 where a print trader grasps that an editor of the customer name addressed as "A production" is wrong in six conditions other than the over print condition, an editor of the customer name addressed as "B publication" is wrong in the over print condition, the transparency degree condition, and the rotation condition, and an editor of the customer name addressed as "C advertisement production" is wrong in the over print condition, the color conversion condition, and the erratum omission of word correction condition.

Specifically, in the customer characteristic information 611, there is described the effect that corrects six conditions other than the over print condition with the content of the correction for the customer name addressed as "A production", and there is described the effect to assume the description in the image file sent to a printing office to be effective about the over print condition. In a similar fashion, there is described the effect that corrects the over print condition, the transparency degree condition, and the rotation condition, with the content of the correction for the customer name addressed as "B publication", and there is described the effect to assume the description in the image file to be effective about other four conditions. Further, there is described the effect that corrects the over print condition, the color conversion condition, and the erratum omission of word correction condition, with the content of the correction for the customer name addressed as "C advertisement production", and there is described the effect to assume the description in the image file to be effective about other four conditions.

The customer characteristic keeping section 610 shown in FIG. 7 keeps the customer characteristic information 611. The customer characteristic information 611 in the customer characteristic keeping section 610 is updated properly by a print trader.

The obtaining section 620 shown in FIG. 7 obtains an image file from the image file pool section 520 shown in FIG. 5, and extracts a customer name of an editor, who enters the image file, from the job definition file of the job definition file pool section 530. Both the image file and the job definition file are transmitted to the correcting section 630.

The correcting section 630 first retrieves the customer characteristic information 611 in the customer characteristic keeping section 610, using the customer name transferred from the obtaining section 620, so that correction information representative of the correction rule associated with the customer name is extracted from the customer characteristic information 611. Thus, the image file is corrected in accordance with the correction rule represented by the extracted correction information.

The corrected image file is transferred to the RIP processing section shown in FIG. 5, so as to be converted into raster data by RIP processing according to the printing condition of the job definition file. The raster data, which is obtained through the conversion, is transmitted to the printer 300.

As mentioned above, according to the image file correcting section 600 that is an embodiment of a work specification correcting apparatus of the present invention, which is incorporated into the RIP apparatus of the print trader, errors in the work specification, which are roughly decided in each editor, is automatically corrected in accordance with the customer characteristic information 611. In effect, according to the image file correcting section 600, it is possible to efficiently correct the work specification in the image file entered from the editor.

According to the present embodiment, as an example of the correction rule referred to in the present invention, there are raised seven sorts of correction information such as over print condition correction information 611b, trapping condition correction information 611c, transparency degree condition correction information 611d, color conversion condition correction information 611e, character appearance condition correction information 611f, erratum omission of word correction condition correction information 611g and rotation condition correction information 611h. It is noted, however, that the present invention is not restricted to this example. It is acceptable that the correction rule referred to in the present invention is one consisting of many sorts of correction information for instance more than seven sorts including correction information other than these seven sorts of correction information. Alternatively, it is acceptable that the correction rule referred to in the present invention is one consisting of few sorts of correction information less than seven sorts, of a part of correction information other than these seven sorts of correction information, or it is acceptable that the correction rule referred to in the present invention is one consisting of two or more sorts of correction information which are different from these seven sorts of correction information.

As mentioned above, according to the present invention, it is possible to efficiently correct work specification in which the content of work is represented by a predetermined form.

While the present invention has been described with reference to the particular illustrative embodiments, it is not to be restricted by those embodiments except as defined in the appended claims. It is to be appreciated that those skilled in the art can change or modify the embodiments without departing from the scope of the present invention as defined in the appended claims.

What is claimed is:

1. A work specification correcting apparatus comprising:
a keeping section that stores a correction rule for a work specification that is created for arranging parts on a page by each of a plurality of creation sources, wherein each of the plurality of work specifications created by the plurality of creation sources represents, in a specified form, work content to be carried out by a work apparatus which receives the work specification, and wherein the keeping section stores the plurality of correction rules for the plurality of work specifications in such a manner that each of the correction rules is associated with the creation source which creates the work specification corresponding to the correction rule;
an obtaining section that obtains the work specification created by one of the plurality of creation sources and obtains creation source information which specifies the creation source that creates the work specification; and
a correcting section that applies a correction to the work specification obtained by the obtaining section in accordance with the correction rule which is one of the plurality of correction rules stored by the keeping section and is associated with the creation source specified by the creation source information obtained by the obtaining section, and transmits the corrected work specification to the work apparatus,
wherein the work apparatus is given parts to be arranged on a page and arranges an image of the page in accordance with each of the plurality of work specifications indicating how to use the parts,
each of the plurality of work specifications includes an over print condition indicative of whether an over print, wherein colors of the parts mutually superposed are overlapped with one another, is admitted, and
the correcting section corrects the over print condition in accordance with the correction rule associated with the creation source specified by the creation source information.

2. A work specification correcting apparatus comprising:
a keeping section that stores a correction rule for a work specification that is created for arranging parts on a page by each of a plurality of creation sources, wherein each of the plurality of work specifications created by the plurality of creation sources represents, in a specified form, work content to be carried out by a work apparatus which receives the work specification, and wherein the keeping section stores the correction rules for the plurality of work specifications in such a manner that each of the plurality of correction rules is associated with the creation source which creates the work specification corresponding to the correction rule;
an obtaining section that obtains the work specification created by one of the plurality of creation sources and obtains creation source information which specifies the creation source that creates the work specification; and
a correcting section that applies a correction to the work specification obtained by the obtaining section in accordance with the correction rule which is one of the plurality of correction rules stored by the keeping section and is associated with the creation source specified by the creation source information obtained by the obtaining section, and transmits the corrected work specification to the work apparatus,
wherein the work apparatus is given parts to be arranged on a page and arranges an image of the page in accordance with each of the plurality of work specifications indicating how to use the parts,
each of the plurality of work specifications includes a trapping condition indicative of a size of an edge as to trapping wherein an area of the parts where other parts came in succession up is deleted leaving the edge of the area, and
the correcting section corrects the trapping condition in accordance with the correction rule associated with the creation source specified by the creation source information.

* * * * *